Figure 1:
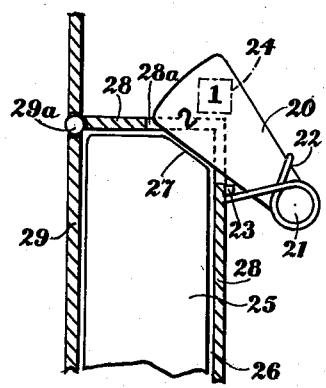

Nov. 12, 1963    G. L. JENKINS ETAL    3,110,215
MAGAZINE ORIENTATION INDICATOR
Filed Jan. 15, 1962    3 Sheets-Sheet 1

Gerald L. Jenkins
Raymond F. Finzer
INVENTORS

BY R. Frank Smith
Robert W. Hampton
ATTORNEYS

Nov. 12, 1963   G. L. JENKINS ETAL   3,110,215
MAGAZINE ORIENTATION INDICATOR
Filed Jan. 15, 1962   3 Sheets-Sheet 2
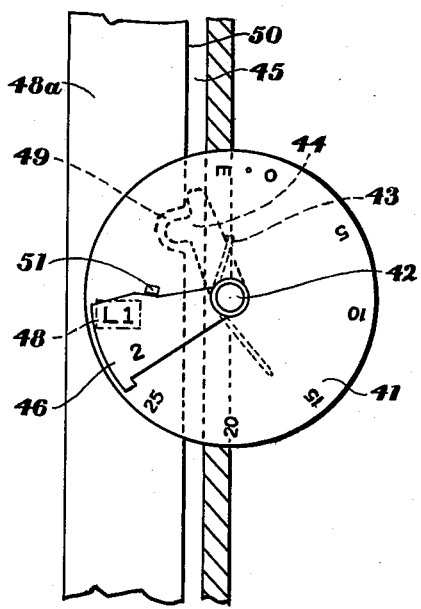
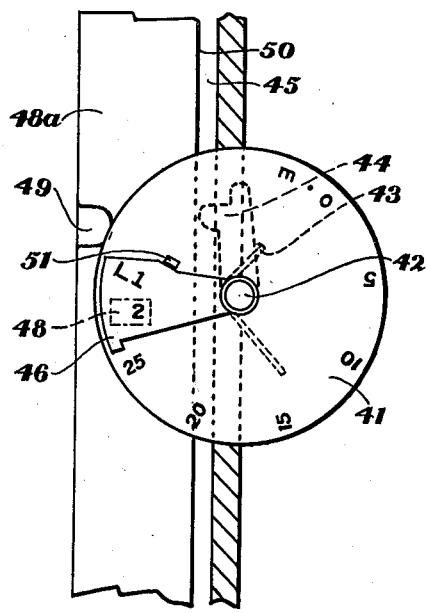
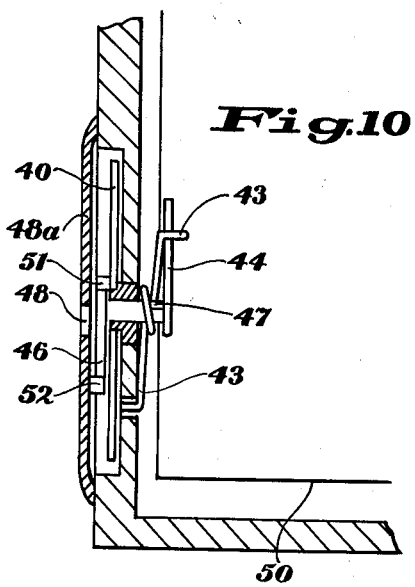
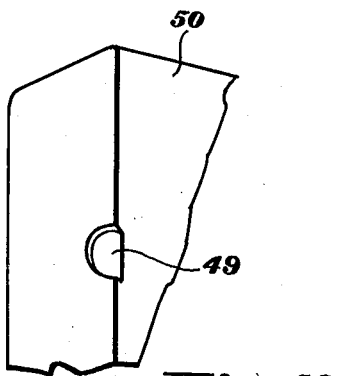
Gerald L. Jenkins
Raymond F. Finzer
INVENTORS
BY R. Frank Smith
Robert W. Hampton
ATTORNEYS

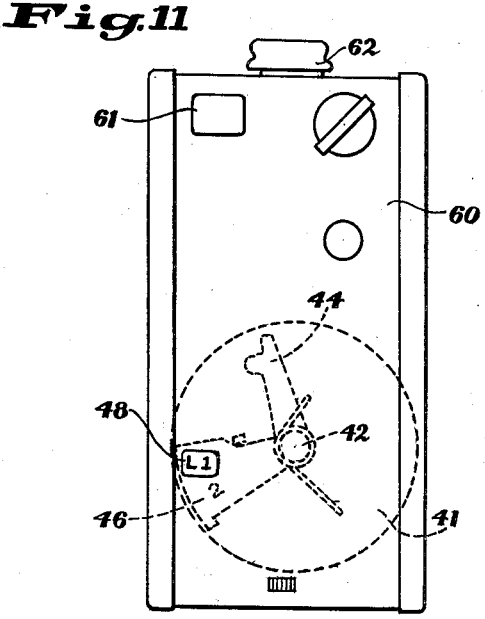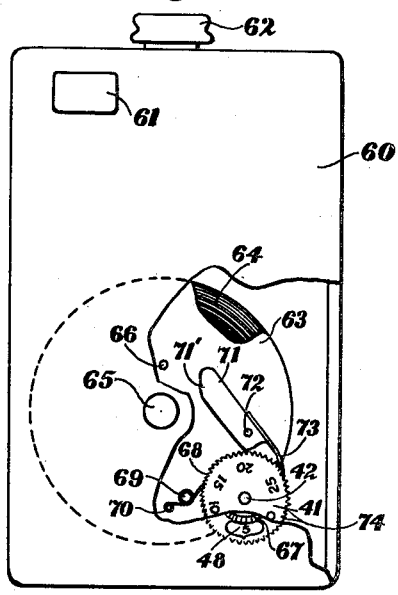

United States Patent Office 3,110,215
Patented Nov. 12, 1963

3,110,215
MAGAZINE ORIENTATION INDICATOR
Gerald L. Jenkins and Raymond F. Finzer, Rochester, N.Y., assignors to Eastman Kodak Company, Rochester, N.Y., a corporation of New Jersey
Filed Jan. 15, 1962, Ser. No. 166,156
13 Claims. (Cl. 88—16)

This invention relates to magazine orientation indicators for cameras adapted to use reversible film magazines, and more particularly to an indicator capable of indicating to the operator of the camera whether a reversible magazine in the camera is in first-side or second-side orientation.

Many cameras, and particularly many of the popular 8 mm. motion picture cameras, employ reversible film magazines. "Reversible," in the sense intended here and in the appended claims, refers to magazines adapted to be operatively insertable into a camera in a first-side orientation and a second-side orientation. For 8 mm. cameras such a magazine is loaded with a 16 mm. film intended for the exposure of two longitudinal columns of images, each 8 mm. wide, one on a first or right-hand column of the film, and the other on the second or left-hand column thereof. On a first run of the film through the camera, the magazine is positioned in first-side orientation and a series of images 8 mm. wide is exposed along the first column of the film. The magazine is then reversed to second-side orientation, the film is run back through the camera, and a series of images 8 mm. wide is exposed along the second column of the film.

Heretofore, a user of such a camera either had to remember which way the magazine was oriented or had to open the camera cover and inspect the magazine to determine its orientation in the camera. Opening the camera cover was very likely to spoil some of the film in the camera. If the user forgot which way the magazine was oriented in the camera, and he did not choose to spoil any film by opening the camera cover, he might mistakenly rely on the extra footage thought to be available upon reversing the magazine, when in fact, he had already reversed the magazine and was already using the second side of the film.

To remedy the above described inconveniences, it is one object of this invention to inform the user of a camera as to whether a reversible magazine is in first-side orientation in the camera or in second-side orientation in the camera.

Another object of this invention is to combine a magazine orientation indicator with a footage dial in such a way that the user of a camera will be informed of the footage remaining on a first-column run through the camera and the footage remaining on a second-column run through the camera, giving the user means for determining the footage yet to be exposed from the entire exposable film footage of a reversible magazine.

An additional object of this invention is to accomplish the above-described objects with apparatus which is simple, durable, trouble-free, and economical to manufacture.

In general, the magazine orientation indicator which is the subject of this invention comprises an indicating means having at least two indicating states, one of which is selected by means responsively controlled by the surface of a magazine positioned in the magazine chamber of the camera. For this purpose, in accordance with the invention, the magazine surface, with which the indicator cooperates responsively, is asymmetrical with respect to first-side orientation and second-side orientation of the magazine in the camera.

The invention will be more clearly understood by reference to the drawings.

Figure 2:
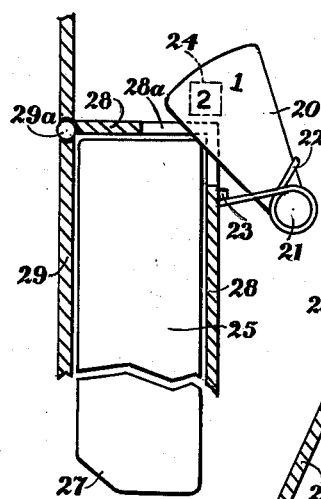
Figure 3:
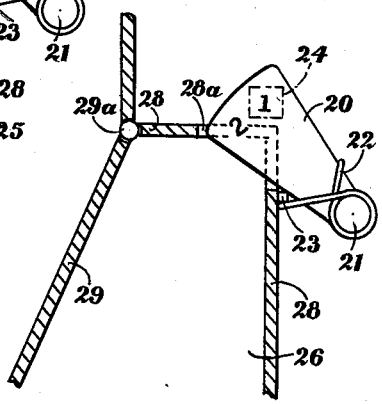
Figures 4, 5:
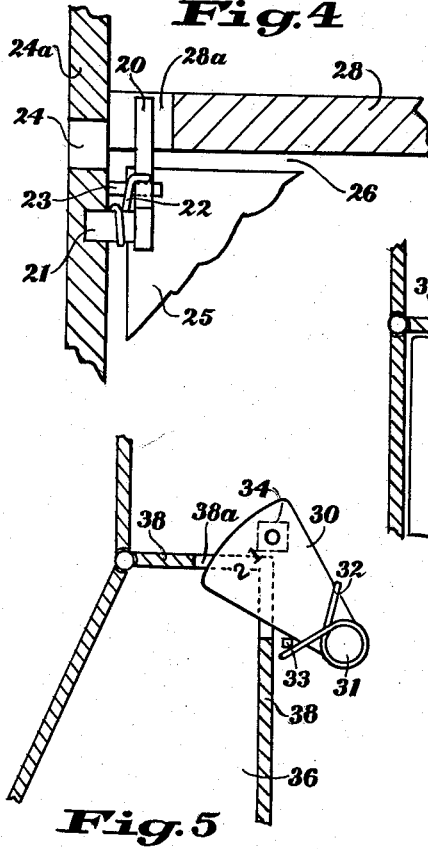
Figure 6:
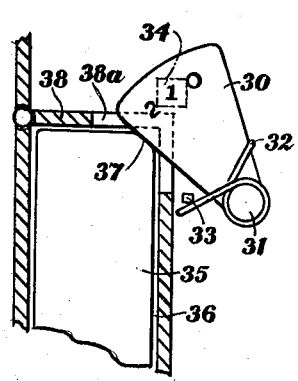
Figure 7:
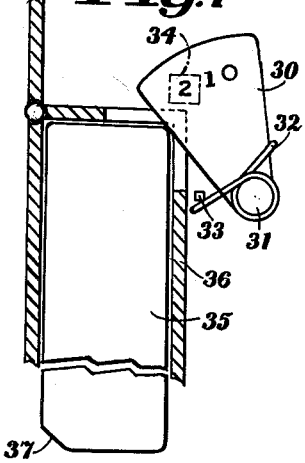

FIG. 1 is a front view of a two-position indicator and a magazine in first-side orientation in the camera.
FIG. 2 is a front view of a two-position indicator and a magazine in second-side orientation in the camera.
FIG. 3 is a front view of a two-position indicator and a camera having no magazine positioned in the magazine chamber.
FIG. 4 is a right side view of an indicator showing its attachment to a camera wall and its relation to a magazine.
FIG. 5 is a front view of a three-position indicator in a camera having no magazine positioned in the magazine chamber.
FIG. 6 is a front view of a three-position indicator engaging a magazine in a first-side orientation in a camera.
FIG. 7 is a front view of a three-position indicator engaging a magazine in a second-size orientation in a camera.
FIGS. 8 and 9 are front views of a magazine orientation indicator associated with a footage dial.
FIG. 10 is a right side view of a magazine orientation indicator associated with a footage dial.
FIG. 11 is a rear view of a camera showing its relation to a magazine orientation indicator combined with a footage dial.
FIG. 12 is an oblique view of a magazine surface, illustrating one form of surface irregularity that may be employed for controlling the magazine orientation indicator of the present invention.
FIG. 13 is a front view of a magnetically operated indicator.
FIG. 14 is a front view of a magnetically operated indicator, showing its relation with a magazine in first-side orientation in a camera.
FIG. 15 is a front view of a magnetically operated indicator, showing its relation with a magazine in second side orientation in a camera.
FIG. 16 is a right-side view of a magnetically operated indicator, showing its relation to a magazine positioned in a camera.
FIG. 17 is a front view of a suitable drive mechanism for advancing a footage dial with which a magazine orientation indicator can be combined.

Referring to FIGS. 1-3, an indicator 20 may be marked with indicia, for example, the numerals "1" and "2," for identifying two indicating positions. The indicator 20 is arranged to pivot about an axis 21, and a spring 22 urges the indicator toward a stop 23. When the indicator 20 is in a first indicating position and is resting against the stop 23, as shown in FIGS. 1 and 3, the indicium "1" appears in an indicator viewing window 24 in a camera casing (not shown) and is visible to the operator of the camera. An aperture 28a in a magazine chamber wall 28 allows the indicator 20 to protrude into a magazine chamber 26 and to move freely between its two indication positions.

In FIG. 1, a magazine 25 is shown positioned in the magazine chamber 26 in a first-side orientation in the camera. With the magazine in this position, the indicator 20 is in a first indicating position, resting against stop 23, with the numeral "1" appearing to the camera user in the window 24.

In this position the indicator 20 does not engage the magazine, because the magazine surface, on the edge nearest the indicator 20, is chamfered as shown at 27.

The magazine surface is asymmetrical in that only one of its edges is chamfered. When the magazine is reversed, the chamfered edge 27 is diagonally opposite indicator 20, as illustrated in FIG. 2.

The chamfer 27, illustrated in FIGS. 1 and 2, is only one of many alternative surface asymmetries that may be used to cooperate with an indicator for selecting indicating states or positions. For example, a notch or recess obviously can be substituted for chamfer 27. A variety of other configurations also are possible, depending upon the selection of the form of indicator and means for sensing engagement or cooperation between the indicator and magazine. A notch form of magazine surface asymmetry is illustrated at 49 in FIG. 12 and also in FIGS. 8, and 9, where such notch is shown associated with an indicator embodiment used in combination with a footage dial.

For the purposes of the invention, the magazine surface can be asymmetrical with respect to some characteristic other than its physical configuration. For example, one corner of a magazine can have an inlay of conducting material for completing a circuit between contacts in the camera. In FIGS. 14–16, a magazine surface asymmetry in the form of a magnet inlay 57 is illustrated. The magnet 57 asymmetrically inlaid in the surface of the magazine 58 operates to position the indicator 53 by attracting magnetic material in an arm 55.

In FIG. 2 the magazine 25 is shown in second-side orientation in the magazine chamber 26 of the camera, and the indicator 20 is shown as engaged by the magazine 25 and displaced from the stop 23 to a second indicating position where the numeral "2" appears in the indicator viewing window 24. With the magazine in this position, the asymmetrical chamfer 27 on one edge of the magazine 25 lies diagonally opposite the magazine edge engaged by the indicator 20.

Illustrated in FIG. 3 is the position of the indicator 20 with respect to the magazine chamber 26 in which no magazine is positioned. The camera cover 29 is shown swung open on its hinge 29a. The indicator 20 in this position rests against the stop 23 and the numeral "1" appears in the indicator window 24.

In FIG. 4, a right side view of the indicator 20 is shown. An aperture 24 in the camera casing 24a is shown as the indicator-viewing window, and a magazine 25 is shown positioned in the magazine chamber 26 in engagement with the indicator 20. The indicator 20 is pivotally mounted about the axis 21, and a spring 22 is arranged for urging the indicator toward a stop 23. The aperture 28a in the magazine chamber wall 28 allows movement of the indicator 20 between indicating positions.

Obviously, as an alternative to the indicator shown in FIGS. 1–3, a two-state indicator can be arranged so that indicating states are selected electrically by means of electric contacts completing a circuit responsively by engagement with an asymmetrical magazine surface. Such an asymmetrical surface could consist of a conducting material inlaid in the surface of a magazine.

Although the magazine orientation indicator 20 is illustrated in both FIGS. 1 and 3 as resting in the first indicating position with the numeral "1" visible in the indicator viewing window 24, the ambiguity thus presented as to whether a magazine is loaded in first-side orientation in the camera or no magazine is in the camera is not as serious as the ambiguity confronting the user of a camera having no magazine orientation indicator. Furthermore, this ambiguity disappears when a magazine orientation indicator is combined with a footage dial. Such combination is explained below. Another possibility for eliminating such an ambiguity is by using a three-position indicator.

An embodiment of an indicator having two indicating positions and a non-indicating state is illustrated in FIGS. 13–16. An indicating arm 53 and a sensing arm 55 are fastened together and pivotally mounted about the axis 54. The indicating arm 53 bears indicia, for example, the numerals "1" and "2," arranged to be visible to a camera operator in the indicator viewing window 56, which is an aperture in the camera casing 59. The sensing arm 55 is made of a magnetic material. A magazine 58 adapted for use with this indicator has a permanent magnet 57 inlaid in the magazine surface and located asymmetrically with respect to first-side orientation and second-side orientation of the magazine in the camera.

In FIG. 14 the magazine 58 is shown positioned in first-side orientation in a camera, in which relation the magnet 57 in the magazine surface attracts and holds sensing arm 55 in the illustrated position in which the indicating arm 53, which is fastened to the sensing arm 55, is held in a first indicating position. In this first indicating position, the numeral "1" of the indicating arm 53 appears in the indicator viewing window 56.

With the magazine 58 reversed to second-side orientation in the camera as illustrated in FIG. 15, the magnet 57, because of its asymmetrical location in the surface of the magazine, attracts and holds the sensing arm 55 in a second position in which the indicating arm 53 is held in a second indicating position with its numeral "2" appearing in the indicator viewing window 56.

In FIG. 13, the indicating arm 53 is shown in an intermediate position between its first and second indicating positions. The indicator is so balanced that when there is no magazine in the camera and the camera is held upright, the indicator 53 will rest in the intermediate position illustrated in FIG. 13, in which position no indicium is visible in the indicator viewing window 56. Of course, a "0" or other suitable indicium could be provided on indicating arm 53 to identify this intermediate position.

FIG. 16 shows a right side view of the indicating arm 53, the sensing arm 55, and a magazine 58 having an inlaid permanent magnet 57. The camera casing 59 is provided with an aperture serving as the indicator viewing window 56. The indicator is pivotally mounted on the camera casing 59 and swings freely about the axis 54.

The indicator illustrated in FIGS. 13–16 will inform a camera user not only whether a magazine is in first-side orientation or second-side orientation in the camera, but so long as the camera is held steadily upright while the indicator is read, whether no magazine is in the camera.

A three-position indicator is illustrated in FIGS. 5–7. An indicator 30 is shown as pivotally mounted about an axis 31, and a spring 32 urges the indicator toward a stop 33. With the indicator 30 in a first indicating position in which it rests against the stop 33 as shown in FIG. 5, the indicator blade 30 protrudes into a magazine chamber 36 through an aperture 38a in a wall 38 of the magazine chamber 36, and the numeral "0" appears in the indicator viewing window 34 in the camera casing (not shown).

With a magazine 35 positioned in the magazine chamber 36 in first-side orientation as illustrated in FIG. 6, the indicator 30 is displaced from the stop 33 to a second indicating position by engagement with an edge of the magazine 35. The edge of the magazine 35 engaged by the indicator 30 in this first-side orientation is provided with a chamfer 37, and the magazine surface is asymmetrical with respect to first and second-side orientation in the camera because only this edge is chamfered. With the indicator 30 in this second indicating position, a numeral "1" appears in the indicator viewing window 34.

The magazine surface asymmetry may be varied as to size, contour, and location on the magazine as explained above. The surface asymmetry embodied in the chamfer 37 is only one of many possibilities. The chamfer 37 could be replaced by a notch. Another type of surface asymmetry adapted for use with an indicator combined with a footage dial is illustrated at 49 in FIGS. 8, 9 and 12.

With the magazine 35 reversed to a second-side orientation in the camera as shown in FIG. 7, the indicator is engaged by a magazine edge diagonally opposite the chamfered edge 37, and by means of this engagement the magazine 35 is displaced from the stop 33 to a third indicating position with the numeral "2" appearing in the indicator viewing window 34. The surface asymmetry between first and second-side orientations of magazine 35, which is embodied in the chamfered edge 37, operates to vary the displacement of the indicator 30 from the stop 33 as between the second indicating position and the third indicating position.

The three position indicator illustrated in FIGS. 5–7 is thus capable of indicating at the "0," or first indicating position, that no magazine is in the magazine chamber, at the "1," or second indicating position, that a magazine is in the camera in a first-side orientation, and at the "2," or third indicating position, that a magazine is in the camera in a second-side orientation.

Of course, first and second indicating positions can be arranged to correspond respectively with first and second-side orientations of a magazine, or the numbering, lettering, or marking of indicating positions with respect to magazine orientations can be arranged in many other ways.

In FIGS. 8–11, a magazine orientation indicator combined with a footage dial is illustrated. Footage dials for cameras are a well known art, and many footage dials exist with which the magazine orientation indicator which is the subject of this invention could be associated or combined. The U.S. Patent 2,186,926 fully discloses one of the many footage dials that can be chosen for this purpose. The footage dial illustrated in FIGS. 8–11 is represented merely as a rotatably mounted dial bearing indicia numbers, and FIG. 17 shows suitable means for advancing and resetting such a dial.

In the combination of magazine orientation indicator and footage dial illustrated in FIGS. 8–11, a magazine orientation indicator, including a sensing arm 44 and an indicating arm 46 fastened together in fixed relation, is pivotally mounted coaxially with a footage dial 41 on an axis 42. A spring 43 engages the sensing arm 44 and urges it toward a magazine chamber 45. The indicating arm 46 bears indicia, for example, the numerals "1" and "2," for identifying first and second indicating positions respectively.

The indicating arm 46 is arranged in front of the footage dial 41 but in a way so as not to obscure a camera operator's view of the indicia on the footage dial. In the embodiment illustrated in FIGS. 8 and 9, the indicator arm 46 is transparent except for the numerals "1" and "2." Once transparency of indicator arm 46 is selected as the means for allowing the camera operator a view of footage dial 41, it is apparent that at least the portion of indicator arm 46 which is radially beyond numerals "1" and "2" must be transparent. Another alternative is for indicator arm 46 not to extend radially beyond the numerals "1" and "2." With either arrangement, the numerals "1" and "2" of indicator 46 are visible alongside the indicia of the footage dial 41 in the indicator viewing window 48.

Referring to FIG. 10, the indicating arm 46 is fastened to the sensing arm 44 by means of a shaft 47, and the two arms pivot together in fixed relation. A cover plate 48a, having an aperture serving as the indicator viewing window 48, has a projecting ear 52 functioning as a stop for engaging the indicating arm 46 in its first indicating position and preventing the spring 43 from urging the indicator counterclockwise beyond this position.

The indicating arm 46 is in the first indicating position and the numeral "1" appears in the indicator viewing window 48 when the sensing arm 44 protrudes into the magazine chamber 45 as shown in FIG. 8. This first indicating position informs the camera operator that there is either no magazine in the magazine chamber, or a magazine is positioned in the magazine chamber in first-side orientation in which orientation it will not engage or displace the sensing arm 44 because a magazine surface recess or notch 49 registers with the sensing arm 44 protruding into the magazine chamber 45.

The notch 49, also illustrated in FIG. 12, is formed in the magazine surface in such a way that the magazine surface is asymmetrical with respect to first-side orientation and second-side orientation in the camera. The notch 49 is merely one of many forms of surface asymmetry which could be used in cooperation with a magazine orientation indicator; for example, the notch 49 could just as well be a projection.

When the magazine is reversed to second-side orientation in the camera as illustrated in FIG. 9, the magazine's surface notch 49, because it is asymmetrically located on the magazine surface, does not lie in registry with the sensing arm 44, and the unnotched magazine surface engages the sensing arm 44 and displaces the sensing arm 44 to the position illustrated in FIG. 9. With the displacement of the sensing arm 44, the indicator arm 46, which is fastened to the sensing arm 44, is displaced the same rotational amount. In this displaced or second indicating position, indicia numeral "2" appears in the indicator viewing window 48.

In FIG. 11 is illustrated a rear view of a camera provided with a magazine orientation indicator combined with a footage dial. The camera has a casing 60, a carrying handle 62, and a viewfinder 61. An indicator viewing window 48 is shown as an aperture in the camera casing 60. Behind the camera casing 60 and represented by broken lines are a footage dial 41, an indicator arm 46, and a sensing arm 44, all pivotable about the axis 42. Visible in the indicator viewing window 48 is the indicium "L" of the footage dial 41, and the numeral "1" of the indicator 46.

Illustrated in FIG. 17, and fully disclosed in U.S. Patent 2,186,926, is an embodiment of one of many drive mechanisms suitable for advancing footage dial 41 through indicating positions. Housed within the camera casing 60, are a ratchet assembly and actuating means for the ratchet assembly. The actuating means is a spring motor drum 63 containing a spring 64 which has one end attached to the drum 63 and the other end (not shown) connected to a shaft 65. A pin 66 is eccentrically mounted on the drum 63.

The driven means is a footage dial 41 pivotally mounted about the axis 42 and having teeth 74 of substantially uniform pitch extending around its periphery. A series of footage indicia are marked on footage dial 41 and are visible from the exterior of the camera through the indicator viewing window 48 provided in the camera casing 60.

A resetting knob 67 on the exterior of camera casing 60 is connected to footage dial 41 for resetting of the footage dial. A holding pawl for preventing retrograde movement of footage dial 41 is provided comprising a wire spring 68 mounted on the interior of the camera casing 60 by a screw 69, having one end engaging the teeth 74 of footage dial 41 to prevent reverse rotation thereof, and having the other end encircling a pin 70 on the camera casing 60.

A driving pawl for intermittently advancing the footage dial 41 by one tooth for each revolution of spring motor cover 63 is provided. The driving pawl comprises an arm 71 pivotally mounted about the axis 72 and an arcuate spring portion 73 having one end connected to or integral with arm 71 and having the other end engaging the teeth 74 of footage dial 41. The driving pawl arm 71 is provided with a curved end 71' which, as the spring drum 63 rotates, is engaged by the pin 66, causing the driving pawl to pivot clockwise about the axis 72 and causing the resilient arm 73 of the driving pawl to advance the footage dial 41 by one tooth. The curvature and resilience of the arm 73 are such that the difference between the length of the arc of the arm 73 and the length of the cord subtending that arc is greater than the pitch of one tooth but less than twice the pitch of one tooth on the ratchet wheel so that it is not possible to move the advancing pawl so as to advance the ratchet wheel more than a single tooth for each actuation.

Other drive mechanisms including other pawl and ratchet drives for footage dials can be adapted for combination with the magazine orientation indicator which is the subject of this invention. Suitable and well-known gearing or other connecting mechanisms can be employed to transmit the intermittent movement of a driven member, such as illustrated as footage dial 41 in FIG. 17, to other locations on the camera casing for adaptation with a magazine orientation indicator.

Referring to FIGS. 8–11, if the footage dial 41 rests at any indicating position other than its initial position, the operator is informed that the camera drive has been advanced since the footage dial was reset, and this is weighty evidence that the camera is loaded and some film has been run through the camera. The only ambiguous signal from the combined indications of the magazine orientation indicator and the footage dial would be a simultaneous "1" and an "L" as illustrated in FIG. 8. This ambiguity is not serious because the "L" or load position indicates that no film has been run through the camera, and if the operator has forgotten whether a magazine is in the magazine chamber or not, he may open the camera cover and look without spoiling any film.

The footage dial illustrated in FIGS. 8 and 9 may be used with a popular 8 mm. motion picture camera magazine which is loaded with 25 feet of 16 mm. film plus a four-foot unsensitized leader or trailer film on each end. Preparatory to the first column run of film through the camera, only a few inches of leader film are threaded on the take-up spool, and accordingly, the footage dial allows for four indicia feet from the "L" or load position to the "25" position indicating the beginning of the sensitized film run; but beyond the end of the exposable film, this first run is stopped when approximately two feet of unsensitized trailer film remain coiled on the supply spool. When the magazine is reversed, the supply and take-up spools interchange in function, and this two coiled feet of unsensitized film should be allowed for by advancing the footage dial from its reset or initial position two indicia feet toward the 25-foot mark which indicates the beginning of the sensitized portion of the film run. The magazine orientation indicator which is the subject of this invention may be arranged in combination with a footage dial to accomplish this advancing of the footage dial for the second-column run to allow for the different leader lengths between the first and second side runs.

As the indicating arm 46 is moved from the first to the second indicating position it engages a projection 51 on the footage dial 41 and rotates the footage dial clockwise a portion of a revolution, and this rotation advances the footage dial the required increment to compensate for the unsensitized leader film which remained coiled on the supply spool of the magazine and which therefore is now coiled on the take-up spool of the reversed magazine. Because of this rotation of the footage dial, the dial is able to indicate accurately the footage remaining on a second-column film run through the camera even though unequal lengths of unsensitized leader film precede the sensitized film as between the first-column run and the second-column run.

Combining the magazine orientation indicator 40 with the footage dial 41 which has an indicating range of from 25 to 0 feet as shown in FIGS. 8–11, enables the combined indications to inform the camera operator of the film footage expended or to be expended throughout an entire 50-foot exposable length of film in a reversible magazine loaded with a double-width, 25-foot length of film. When a magazine is in the camera and the magazine orientation indicator's numeral "1" appears in the indicator viewing window 48, the camera operator knows that the magazine is in first side orientation in the camera. If the indicium "L" appears alongside the "1," the operator knows that the camera take-up has not been advanced beyond the "load" position, and no film has been run through the camera. As the leader strip is run through the camera, the footage dial 41 advances from "L" to "25" (the beginning of the exposable film run). As the footage dial 41 advances from "25" through decreasing numerals to "0" the operator may read what film footage remains to be exposed on a first-column run of the film through the camera. When the "0" footage mark appears in the window along with the indicia numeral "1" of the magazine orientation indicator, the operator knows the film is expended on its first-column run through the camera. The operator then runs two feet of trailer film through the camera, and then reverses the magazine, resetting the footage dial. The indicator 46 moves from the first to the second indicating position as the magazine is inserted in the camera in second-side orientation, and by means of the projection 51, the footage dial 41 is advanced two indicia feet toward the "25" position to allow for the two feet of leader film coiled upon what is now the take-up spool.

The appearance of the magazine orientation indicator's numeral "2" in the indicator viewing window informs the operator that the magazine is in second-side orientation in the camera. As the two feet of leader film is run through the camera the footage dial 41 advances to the "25" position which indicates the beginning of the exposable film run. As the exposable film is run through the camera on its second-column exposure run, the footage dial indicates decreasing film footages from "25" to "0" visible alongside the indicia numeral "2" in the indicator viewing window to inform the operator of the film footage remaining on his second-column run. When "0" film footage and the indicia numeral "2" appear together in the indicator viewing window, the operator is informed that all of the exposable film is expended on the second-column run through the camera, and after the leader film is run through the camera, the magazine is ready to be unloaded. Thus it is clear that by means of the combined indications of a magazine orientation indicator and a film footage dial, a camera operator is informed of the amount of film exposed and unexposed in a reversible magazine at any time during the entire first and second-column runs through the camera.

The invention has been described in detail with particular reference to the preferred embodiments thereof, but it will be understood that variations and modifications can be effected within the spirit and scope of the invention as described hereinabove and as defined in the appended claims.

We claim:

1. In a camera adapted to use a reversible film magazine which is operatively insertable into said camera in a first-side orientation and a second-side orientation, means for indicating a predetermined one of said orientations of said magazine in said camera, comprising in combination: means on said magazine defining a surface asymmetry with respect to first-side orientation and second-side orientation of said magazine in said camera; and an indicator having an indicating state, said indicator being arranged for assuming said indicating state under control of the asymmetrical surface on said magazine whenever said magazine is in said camera only in said predetermined orientation.

2. In a camera adapted to use a reversible film magazine which is operatively insertable into said camera in a first-side orientation and a second-side orientation, means for indicating a predetermined one of said orientations of said magazine in said camera, comprising in combination: a magazine surface which is asymmetrical with respect to first-side orientation and second-side orientation of said magazine in said camera; and an indicator having an indicating state and a normally assumed non-indicating state, said indicator being induced to assume said indicating state under control of said asymmetrical magazine surface whenever said magazine is positioned in said camera only in said predetermined orientation.

3. In a camera adapted to use a reversible film magazine which is operatively insertable into said camera in a first-side orientation and a second-side orientation, means for indicating a predetermined one of said orientations of said magazine in said camera, comprising in combination: means defining a magazine surface such that at a predetermined location on said camera, said magazine surface varies between said first-side orientation position of said magazine in said camera and said second-side orientation position of said magazine in said camera; and an indicator having at least one indicating state, said indicator being induced to assume said indicating state by controlled interaction with said magazine surface at said predetermined point on said camera when said magazine is in said camera only in said predetermined orientation.

4. In a camera adapted to use a reversible film magazine which is operatively insertable into said camera in a first-side orientation and a second-side orientation, means for indicating a predetermined one of said orientations of said magazine in said camera, comprising in combination: means on said magazine defining a surface asymmetry with respect to first-side orientation and second-side orientation of said magazine in said camera; sensing means disposed for co-operatively responding under control of the surface asymmetry on said magazine for detecting said predetermined orientation of said magazine in said camera; an indicator having at least one indicating state; and means operatively connecting said sensing means to said indicator for causing the latter to assume said indicating state whenever said magazine is in said camera only in said predetermined orientation.

5. In a camera adapted to use a reversible film magazine which is operatively insertable into said camera in a first-side orientation and a second-side orientation, means for indicating a predetermined one of said orientations of said magazine in said camera, comprising in combination: a magazine surface which is asymmetrical in contour with respect to first-side orientation and second-side orientation of said magazine in said camera; and an indicator movable between an indicating state and a normally assumed non-indicating state, said idicator being arranged so as to be displaced from said non-indicating state and held in said indicating state under control of said asymmetrical magazine surface contour whenever said magazine is in said camera only in said predetermined orientation.

6. In a camera adapted to use a reversible film magazine which is operatively insertable into said camera in a first-side orientation and a second-side orientation, means for indicating said orientations of said magazine in said camera, comprising in combination: means on said magazine defining a surface asymmetry with respect to said first-side orientation and said second-side orientation of said magazine in said camera; and an indicator having a first indicating state and a second indicating state, said indicator being disposed for assuming said first indicating state under control of the asymmetrical surface on said magazine whenever said magazine is in said camera only in said first-side orientation, and said indicator being disposed for assuming said second indicating state under control of the asymmetrical surface on said magazine whenever said magazine is in said camera only in said second-side orientation.

7. In a camera adapted to use a reversible film magazine which is operatively insertable into said camera in a first-side orientation and a second-side orientation, means for indicating said orientations of said magazine in said camera, comprising in combination: means on said magazine defining a surface which is asymmetrical in contour with respect to first-side orientation and second-side orientation of said magazine in said camera; a movable indicator having a first indicating position, a second indicating position and a normally assumed non-indicating position; resilient means normally maintaining said indicator in said non-indicating position; means controlled by said magazine surface asymmetry for displacing said indicator to said first indicating position whenever said magazine is in said camera only in said first-side orientation; and means controlled by said magazine surface asymmetry for displacing said indicator to said second indicating position whenever said magazine is in said camera in said second-side orientation.

8. In a camera adapted to use a reversible film magazine which is operatively insertable into said camera in a first-side orientation and a second-side orientation, means for indicating a predetermined one of said orientations of said magazine in said camera, comprising in combination: a chamber in said camera for receiving said magazine; on said magazine, a surface configuration defining a recess located asymmetrically with respect to said first and second-side orientations of said magazine in said camera; an indicator including a sensing arm and an indicating arm fastened together in fixed relation, said indicator being movable between an indicating position and a normally assumed position in which said sensing arm is arranged so as to protrude into said chamber for said magazine and to register with said recess whenever said magazine is in said chamber only in said first-side orientation; resilient means for urging said indicator toward said normally assumed position; and means for engagement between said sensing arm and said magazine surface for displacing said indicator to said indicating position under control of said magazine surface, whenever said magazine is in said chamber only in said second-side orientation.

9. The indicator defined in claim 1 in combination with a film footage dial.

10. The indicator defined in claim 5 in combination with a film footage dial.

11. The indicator defined in claim 7 mounted coaxially with a footage dial and arranged for engagement with said footage dial for advancing said footage dial as said indicator is displaced to said second indicating position.

12. The indicator defined in claim 8 mounted coaxially with a footage dial and arranged for engagement with said footage dial for advancing said footage dial as said indicator is displaced to said indicating position.

13. In a camera adapted to use a reversible film magazine which is operatively insertable into said camera in a first side orientation and a second side orientation, the combination comprising: a resettable footage dial indicator advanceable from a starting position through an indicating range; a magazine surface which is asymmetrical with respect to said first side and second side orientation of said magazine in said camera; and means operable under control of said asymmetrical surface for advancing said indicator from said starting position in response to positioning of said magazine in said camera in said second side orientation.

References Cited in the file of this patent
FOREIGN PATENTS
636,371    Germany _____ Oct. 8, 1936